(12) United States Patent
Brasten et al.

(10) Patent No.: US 11,280,695 B2
(45) Date of Patent: Mar. 22, 2022

(54) SYSTEM AND METHOD FOR TESTING CLOSURE INTEGRITY OF A SEALED CONTAINER AT CRYOGENIC TEMPERATURES

(71) Applicant: West Pharmaceutical Services, Inc., Exton, PA (US)

(72) Inventors: Louis J. Brasten, Downingtown, PA (US); James McCaw, Birdsboro, PA (US)

(73) Assignee: West Pharmaceutical Services, Inc., Exton, PA (US)

( * ) Notice: Subject to any disclaimer, the term of this patent is extended or adjusted under 35 U.S.C. 154(b) by 0 days.

(21) Appl. No.: 17/296,524

(22) PCT Filed: Nov. 25, 2019

(86) PCT No.: PCT/US2019/063006
§ 371 (c)(1),
(2) Date: May 24, 2021

(87) PCT Pub. No.: WO2020/112634
PCT Pub. Date: Jun. 4, 2020

(65) Prior Publication Data
US 2021/0396624 A1    Dec. 23, 2021

Related U.S. Application Data

(60) Provisional application No. 62/771,664, filed on Nov. 27, 2018.

(51) Int. Cl.
*G01M 3/22*    (2006.01)
(52) U.S. Cl.
CPC ................... *G01M 3/226* (2013.01)

(58) Field of Classification Search
CPC .......... G01M 3/00; G01M 3/20; G01M 3/226; G01M 3/202; G01M 3/32
(Continued)

(56) References Cited

U.S. PATENT DOCUMENTS 2,697,935 A * 12/1954 Gordon .................. G01M 3/04
73/45.5
2,863,315 A * 12/1958 Joris ....................... H01J 41/06
73/40.7
(Continued)

FOREIGN PATENT DOCUMENTS

CN    106768687 A  *  5/2017
CN    107044902 A  *  8/2017
(Continued)

OTHER PUBLICATIONS

Int'l Search Report and Written Opinion dated Mar. 10, 2020 in Int'l Application No. PCT/US2019/063006.

*Primary Examiner* — David A. Rogers
(74) *Attorney, Agent, or Firm* — BakerHostetler (57) ABSTRACT

A system for testing the closure integrity of a sealed container at a cryogenic temperature is provided. The system includes a sealed container containing helium having an opening sealed by a closure, a cryogenic storage vessel at least partially filled with a cryogenic fluid at the cryogenic temperature, a hollow tube extending through an opening of the cryogenic storage vessel, a fixture configured to engage the sealed container, and a leak detection unit connected to the hollow tube. The hollow tube has a first end positioned outside of the cryogenic storage vessel and an opposing second end positioned inside the cryogenic storage vessel. The fixture is configured to be removably inserted within the hollow tube through an opening at the first end of the hollow (Continued)

tube, such that the sealed container is positioned at or proximate the second end of the hollow tube.

20 Claims, 11 Drawing Sheets

(58) Field of Classification Search
USPC .................. 73/40, 40.7, 45.5, 49.2, 49.3
See application file for complete search history.

(56) References Cited

U.S. PATENT DOCUMENTS

| | | | | |
|---|---|---|---|---|
| 3,597,611 A | * | 8/1971 | Harman | G01M 3/202 250/303 |
| 3,712,112 A | * | 1/1973 | Widmer | G01M 3/10 73/37 |
| 3,798,536 A | * | 3/1974 | Maillard | G01M 3/205 324/466 |
| 3,803,900 A | | 4/1974 | Maillard | |
| 4,345,458 A | * | 8/1982 | Kosaka | F17C 13/002 73/37.5 |
| 4,583,394 A | * | 4/1986 | Murakami | G01M 3/202 73/40.7 |
| 4,608,866 A | * | 9/1986 | Bergquist | G01M 3/202 73/40.7 |
| 4,785,666 A | * | 11/1988 | Bergquist | G01M 3/202 73/40.7 |
| 5,131,263 A | * | 7/1992 | Handke | G01M 3/202 73/40.7 |
| 5,343,740 A | * | 9/1994 | Myneni | F04B 37/08 62/55.5 |
| 5,477,692 A | * | 12/1995 | Myneni | F04B 37/08 62/55.5 |
| 7,836,754 B1 | * | 11/2010 | Skaff | G01M 3/229 73/45.5 |
| 8,899,099 B2 | * | 12/2014 | Grosse Bley | G01M 3/202 73/40.5 R |
| 10,753,821 B2 | * | 8/2020 | Baird, IV | G01M 3/3245 |
| 2012/0248057 A1 | | 10/2012 | Bogle et al. | |
| 2016/0109321 A1 | * | 4/2016 | Endo | G01M 3/2846 73/40.7 |

FOREIGN PATENT DOCUMENTS

| | | |
|---|---|---|
| JP | 03-195935 A | 8/1991 |
| JP | 08-122195 A | 5/1996 |
| JP | 2014081250 A * | 5/2014 |
| RU | 2730129 C1 * | 8/2020 |
| WO | WO-2020224632 A1 * | 11/2020 |

* cited by examiner

SYSTEM AND METHOD FOR TESTING CLOSURE INTEGRITY OF A SEALED CONTAINER AT CRYOGENIC TEMPERATURES

CROSS-REFERENCE TO RELATED APPLICATIONS

This application is a section 371 of International Application PCT/US2019/063006, filed Nov. 25, 2019, which was published on Jun. 4, 2020 under Publication No. WO 2020/112634 A1, and which claims priority from U.S. Provisional Application No. 62/771,664, filed Nov. 27, 2018, the disclosures of both are herein incorporated by reference in its entirety.

BACKGROUND OF THE INVENTION

The present invention is directed to an apparatus and method for testing the closure integrity of containers, such as vials, cartridges, syringes and the like, at cryogenic temperatures.

In the selection of the packaging components for biologic and pharmaceutical materials, the integrity of the seal between the container and the closure is a consideration. These materials are typically stored in stoppered glass or plastic containers (e.g., glass or plastic vials or syringes) with an elastomeric closure. These materials include, for example, blood, serum, proteins, peptides, stem cells, DNA, and other perishable biological liquids, and freeze-dried or lyophilized drug products.

The container must be capable of protecting the materials from a variety of potential sources of contamination including microbial ingress, moisture and gas exchange. Thus, the efficacy of the container closure is often tested for the purpose of determining the container closure integrity (CCI). CCI is the ability of a container closure system to provide protection and therefore maintain the efficacy and sterility of a material, specifically a drug product, throughout its shelf life. The ability of elastomeric seal components (e.g., a stopper) to prevent microbial ingress into drug containers is determined through container closure integrity testing (CCIT), which measures the integrity of the seal between the closure and the container.

The primary seal is formed at the interface of the elastomeric seal component and the container. Assuming there are no defects in the individual packaging components, this interface represents the principal point of potential packaging failure. Multiple factors must be considered in the selection and application of the appropriate container closure system for a drug product to assure satisfactory container closure integrity.

Failures in manufacturing, such as improper assembly, inadequate or excessive crimping force, or faulty design can compromise the integrity of the container closure system. Therefore, it is imperative to ensure that the dimensions of the elastomeric seal component correctly match the container to establish adequate seal integrity. Vacuum loss, gas ingress and exchange, pH adjustments and contaminants can compromise seal integrity, which could lead to loss of sterility of the drug product that subsequently can affect product efficacy and increase the risk to patient safety.

With the increasing trend toward high-value biologics and drug products, the requirements for reliable container closure systems have become even more critical. Such biologics and drug products are typically sensitive to temperature, and the potential for degradation is significant if they are not stored under appropriate conditions. It is not uncommon for some biologics and drug products to be stored in sealed containers at temperatures as low as $-80°$ C., and in many cases even lower at cryogenic temperatures (e.g., as low as or below $-150°$ C.), for example to avoid deterioration or evaporation loss of these materials.

As noted above, the sealing component of most drug containers is made of an elastomer. A common physical property of all elastomers is the temperature at which the elastomer loses its elastic properties and changes to a rigid, glass-like state. This is known as the glass transition temperature (Tg). Under ambient temperature conditions, the molecules are in a constant state of thermal motion and constantly change their configuration which provides flexibility and hence the ability to form a seal against another surface. However, at the glass transition temperature, the mobility of molecules is significantly reduced and the material becomes brittle and glass-like. For example, the glass transition temperature of common butyl rubbers is around $-65°$ C. As a result, elastomeric seal components may not be capable of maintaining closure integrity at cryogenic temperatures and could potentially compromise the sterility of the biologic or drug product stored in the container. However, if biologics or pharmaceuticals are to be stored at cryogenic temperatures, then container closure integrity should be established under those conditions.

Accordingly, it would be desirable to provide an apparatus and method for testing sealed containers at or below cryogenic temperatures to ensure that container closure integrity is maintained under conditions to which the contents of the sealed container might be exposed, and more particularly to help ensure that the stopper or closure will effect a complete seal of the container opening at temperatures below about $-150°$ C., and more particularly at about $-180°$ C. It may also be desirable to help ensure that the stopper or closure will effect a complete seal of the container opening at temperatures below about $-196°$ C.

BRIEF SUMMARY OF THE INVENTION

In one embodiment, the present invention relates to a system for testing the closure integrity of a sealed container at a cryogenic temperature. The system includes a sealed container containing helium having an opening sealed by a closure; a cryogenic storage vessel at least partially filled with a cryogenic fluid at the cryogenic temperature, the cryogenic storage vessel having a first end and an opposing second end, the first end being provided with an opening; a hollow tube extending through the opening of the cryogenic storage vessel, the hollow tube having a first end positioned outside of the cryogenic storage vessel and an opposing second end positioned inside the cryogenic storage vessel; a fixture having a first end and an opposing second end, the second end being configured to engage the sealed container, the fixture being configured to be removably inserted within the hollow tube through an opening at the first end of the hollow tube, such that the sealed container is positioned at or proximate the second end of the hollow tube; and a leak detection unit connected to the hollow tube.

Another embodiment of the present invention relates to a method of testing the closure integrity of a sealed container at a cryogenic temperature. The method includes providing a sealed container containing helium; providing a cryogenic storage vessel at least partially filled with a cryogenic fluid at the cryogenic temperature, the cryogenic storage vessel having a first end and an opposing second end, the first end being provided with an opening; positioning a hollow tube within the opening of the cryogenic storage vessel, the hollow tube having a first end positioned outside of the cryogenic storage vessel and an opposing second end positioned inside the cryogenic storage vessel below a fill level of the cryogenic fluid; securing the sealed container at a distal end of a fixture; inserting the fixture into the hollow tube, such that the sealed container is positioned at or proximate the second end of the hollow tube; and connecting the hollow tube to a leak detection unit and measuring a flow rate of the helium escaping from the sealed container at the cryogenic temperature.

Another embodiment of the present invention relates to a method of testing the closure integrity of a sealed container at a cryogenic temperature. The method includes preparing a sealed container by inserting an elastomeric stopper into an opening of a container, forming a first opening and a second opening through a body of the elastomeric stopper, connecting a first conduit to the first opening with a first end of the first conduit being engaged with the first opening and an opposing second end of the first conduit being engaged to a supply of helium, connecting a second conduit to the second opening with a first end of the second conduit being engaged with the second opening, supplying helium into the container via the first conduit until air within the container has been displaced with helium with the displaced air exiting the container via the second conduit, removing the first and second conduits from the respective first and second openings, and covering the first and second openings with a cyanoacrylate adhesive and allowing the cyanoacrylate adhesive to cure for a predetermined period of time in order to form the sealed container. The method further includes providing a cryogenic storage vessel at least partially filled with a cryogenic fluid at the cryogenic temperature, positioning the sealed container within the cryogenic storage vessel, and using a leak detection unit connected to the cryogenic storage vessel and measuring a flow rate of the helium escaping from the sealed container at the cryogenic temperature.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Certain terminology is used in the following description for convenience only and is not limiting. The words "proximal," "distal," "upward," "downward," "bottom" and "top" designate directions in the drawings to which reference is made. The words "inwardly" and "outwardly" refer to directions toward and away from, respectively, a geometric center of the device, and designated parts thereof, in accordance with the present invention. Unless specifically set forth herein, the terms "a," "an" and "the" are not limited to one element, but instead should be read as meaning "at least one." The terminology includes the words noted above, derivatives thereof and words of similar import.

Referring to the drawings in detail, wherein like numerals indicate like elements throughout the several views, FIGS. 1-8 show a preferred embodiment of an apparatus and method for testing the closure integrity of containers closed by a closure at cryogenic temperatures.

As used herein, the term "closure" may include any device which seals an opening of a container in the manner of a plug, plunger or stopper, i.e., by having a resilient material press against the entire periphery of the opening to form a seal. As used herein, the term "container" may include any sealable receptacle or holder for a material, and more particularly one which is subjected to cryogenic temperatures during processing, storage or the like. More particularly, as used herein, the term "container" may include, for example, vials, bottles, syringes, pre-filled drug delivery devices, laboratory vessels, and the like, which have an opening that is capable of being sealed by a closure to maintain the integrity of the contents. It will be understood by those skilled in the art that the inventive system/method may be utilized with filled or non-filled containers.

Some embodiments of the invention may be practiced at cryogenic temperatures. More particularly, embodiments of the invention may be practiced at temperatures of about −80° C. or below, preferably about −150° C. or below, more preferably about −180° C. or below, and most preferably temperatures below about −196° C. At cryogenic temperatures, many biological materials, such as blood, serum, proteins, peptides, stem cells, DNA, and other perishable substances may be stored to maintain viability for long periods of time. Such storage includes dry ice storage (sublimation point −78.5° C.).

The present invention relates to a system and method for evaluating the CCI of a closed container. More particularly, the present invention relates to a helium leak detection apparatus and method for CCI testing of a closed container at cryogenic temperatures. Helium leak detection provides quantitative results that are reproducible and more accurate than qualitative pass/fail results.

Figure 1:
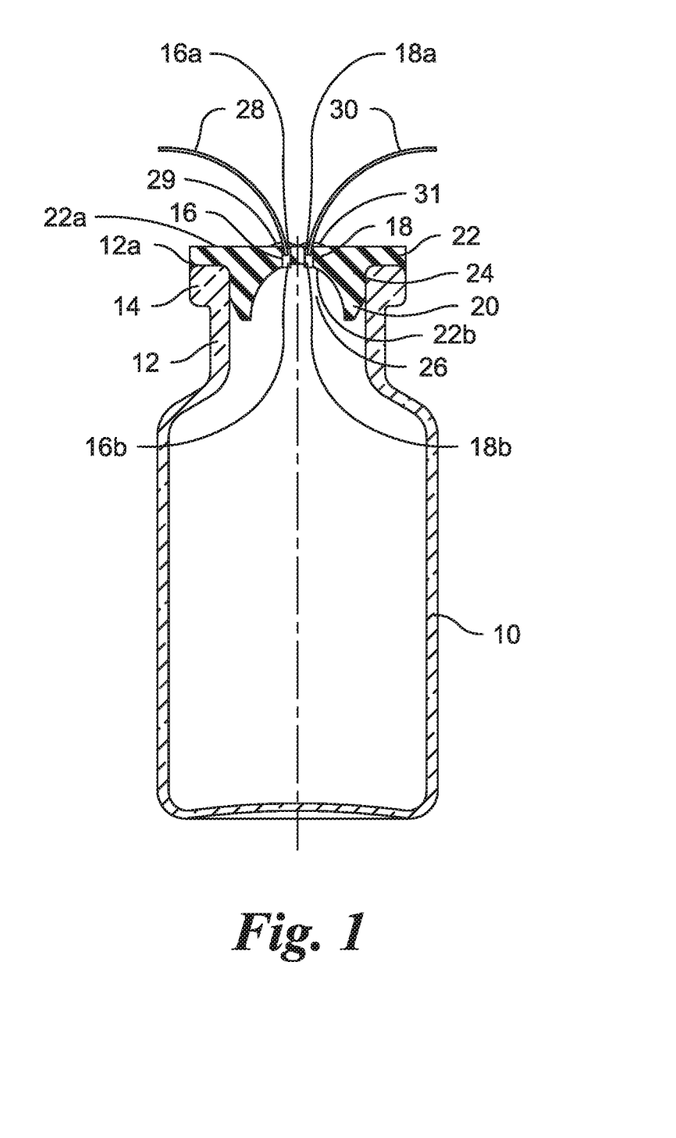
FIG. 1 is a cross-sectional view of a conventional sealed container, according to an embodiment of the present invention.

A conventional type of closed container which may be utilized in the testing system and method of the present invention is shown in FIG. 1. Referring to FIG. 1, there is shown a vial 10 containing a drug product or formulation (not shown). The vial 10 has a neck 12 with an open end 12*a* circumscribed by a flange 14 having a generally annular shape. A closure or stopper 20, and more particularly an elastomeric stopper, is positioned at the open end 12a of the vial 10 to seal the vial 10. Specifically, the stopper 20 has a stopper flange 22 and a stopper plug 24 extending downwardly from the flange 22. The stopper plug 24 is sealingly inserted in the opening circumscribed by the neck 12 of the vial 10. The stopper plug 24 has a generally central cavity 26. The cavity 26 of the stopper plug 24 has a first end closed by a pierceable portion, preferably provided at a geometric center, of the stopper flange 22, and a second end in open fluid communication with the contents of the vial 10. The stopper 20 may be made of any resilient material or elastomer known to be suitable for use in pharmaceutical applications. The vial 10 may be made of any glass, ceramic, or polymer known to be suitable for use in pharmaceutical applications.

In one embodiment, the testing method of the present invention is carried out after the vial 10 and stopper 20 have been assembled together, as shown in FIG. 1, and crimped and/or capped. Specifically, referring to FIG. 1, to prepare the vial 10 for the testing method and apparatus, the stopper 20 is first provided with a first opening 16 and a second opening 18. The first and second openings 16, 18 are also referred to herein as puncture sites. Preferably, the first and second openings 16, 18 are of the same size, but it will be understood that the two openings 16, 18 may be of differing sizes. In one embodiment, the first and second openings 16, 18 are provided at a geometric center of the stopper flange 22, but it will be understood that the openings 16, 18 may be formed anywhere in the stopper flange 22. Each opening 16, 18 extends fully through the body of the stopper flange 22, such that each opening 16, 18 has a first end 16a, 18a formed at an upper surface 22a of the stopper flange 22 and a second end 16b, 18b formed at a lower surface 22b of the stopper flange 22. The second end 16b, 18b of each of the first and second openings 16, 18 is in communication with the interior of the vial 10.

Each opening 16, 18, and more preferably the first end 16a, 18a of each opening 16, 18, is provided with or connected to a respective conduit or line 28, 30. For example, each opening 16, 18 may be provided with or connected to a respective needle. The first conduit 28 positioned in or connected to the first opening 16 serves to supply an inert gas, such as helium, to the interior of the sealed vial 10. The second conduit 30 positioned in or connected to the second opening 18, acts a vent or egress line through which air displaced by the inert gas can exit the vial 10, to prevent over-pressurization of the vial 10. Preferably, the vial 10 is prepared by filling the vial 10 with a volume of inert gas sufficient to ensure complete displacement of air from the vial 10. Preferably, the vial 10 is prepared by displacing the air in the vial 10 with inert gas at a volume of ten times the headspace of the vial 10 to ensure complete displacement of air from the vial 10. In a preferred embodiment, the vial 10 is prepared by displacing the air in the vial 10 with 100% helium at a volume of ten times the headspace to ensure complete displacement of air from the vial 10. The headspace (i.e., the gas space above the drug product level) includes the cavity 26 of the stopper plug 24. It will be understood that the fill volume of the inert gas need not necessarily amount to ten times the headspace of the vial 10, only that the volume is sufficient to ensure complete displacement of air from the vial 10. Preferably, the helium fill process is performed at room temperature.

Once the vial 10 is filled with helium, as described above, the first and second conduits 28, 30 are disengaged and removed from the respective first and second openings 16, 18. Subsequently, each of the first and second openings 16, 18 is covered with a layer 29, 31 of adhesive. The adhesive may be any material which is configured to seal the openings 16, 18. In one embodiment, the adhesive is an epoxy adhesive, and more particularly a quick-curing or rapid-bonding epoxy adhesive. Preferably, the epoxy adhesive comprises bisphenol A diglycidyl ether resin. A preferred commercially available epoxy adhesive is Devcon® Part No. 14250. In another embodiment, the adhesive is a glue, and more particularly a quick-curing or rapid-bonding glue. For example, the adhesive is preferably a cyanoacrylate adhesive. After the adhesive layers or coatings 29, 31 are applied to the respective first and second openings 16, 18, the applied adhesive is left undisturbed for a predetermined period to allow the adhesive to cure. Preferably, the adhesive layers or coatings 29, 31 are allowed to cure for a predetermined amount of time, until they have sufficiently hardened to seal the openings 16, 18 and thus form a sealed vial 10. Depending on the type of adhesive used, the curing duration may be a few seconds to a few minutes, or may be longer (e.g., approximately one hour) depending on the particular properties of the adhesive used.

Next, after the adhesive has cured, the vial 10 is crimped and/or capped and may be subjected to testing or may be stored at a predetermined temperature, such as room temperature or cryogenic temperatures, until it is ready for testing. Preferably, the sealed vial 10 may be slowly cooled down to a predetermined temperature, such as −80° C., before testing at cryogenic temperatures.

It will be understood that while the process of preparing the vials 10 has been described herein with respect to a single vial 10, a plurality of vials 10 may prepared as described herein, with testing to be carried out individually on each vial 10, as discussed below.

It will also be understood that the vials 10 may be filled with helium by any known process and system for doing so, and not necessarily the aforementioned process.

For example, in another embodiment, the method of the present invention is carried out before the vial 10 and stopper 20 have been assembled together and crimped and/or capped. Specifically, to prepare the vial 10 for the testing method and apparatus, before the stopper 20 is inserted into the open end 12a of the vial 10, an inert gas, such as helium, is supplied to the interior of the vial 10 via the open end 12a, preferably at room temperature. Once the vial 10 is filled with a predetermined amount of the inert gas (e.g., to displace the air in the vial 10 with 100% helium at a volume of ten times the headspace to ensure complete displacement of air from the vial 10), the stopper 20 is positioned at the open end 12a of the vial 10 to seal the vial 10, and then the sealed vial 10 is capped and crimped. Next, the vial 10 may be immediately subjected to testing or may be stored at a predetermined temperature, such as room temperature or cryogenic temperatures, until it is ready for testing. Preferably, the sealed vial 10 may be slowly cooled down to a predetermined temperature, such as −80° C., before testing at cryogenic temperatures.

Figure 3A:
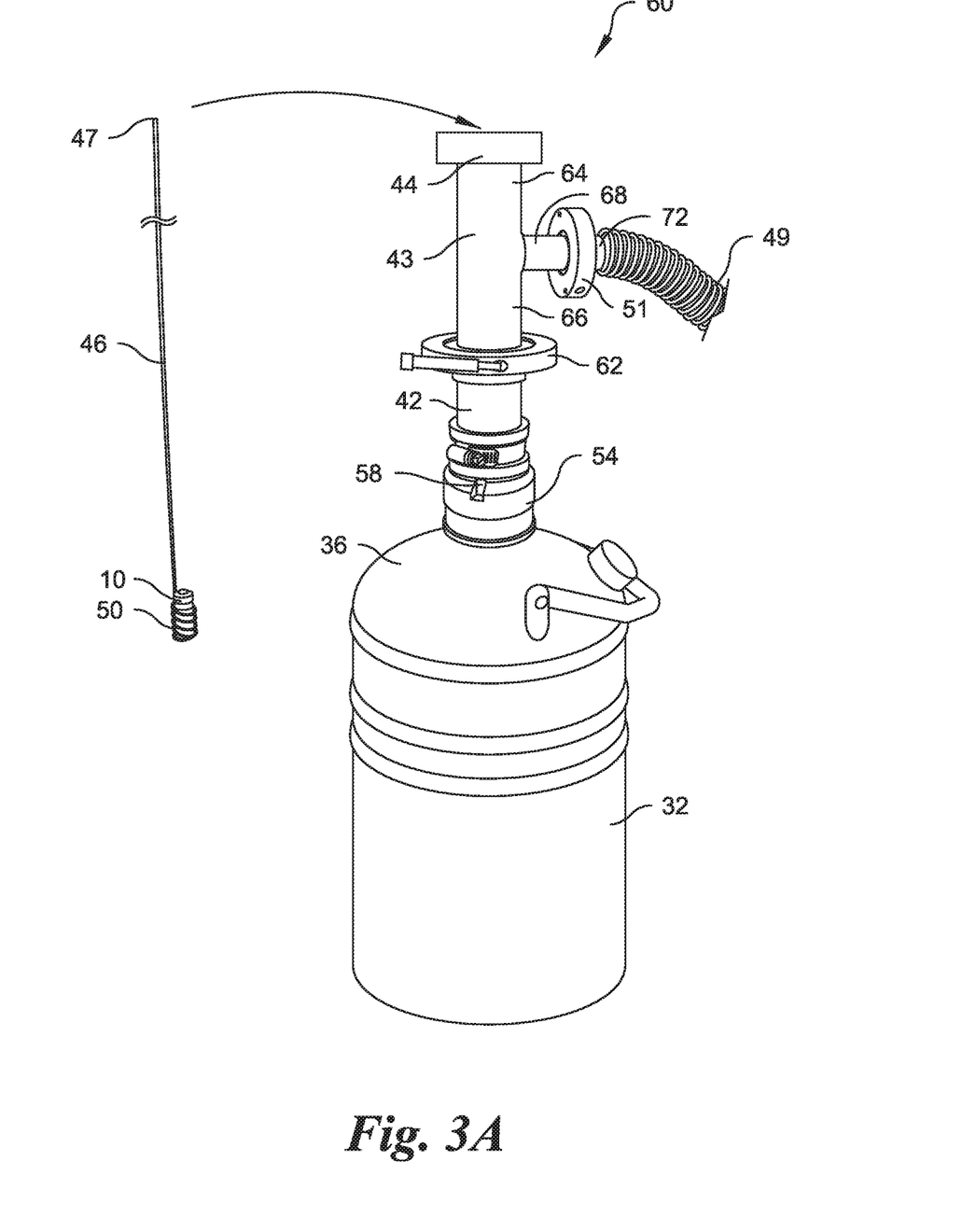
FIGS. 3A-3B depict a mechanism for securing the sealed vial for testing, according to an embodiment of the present invention.
Figure 6:
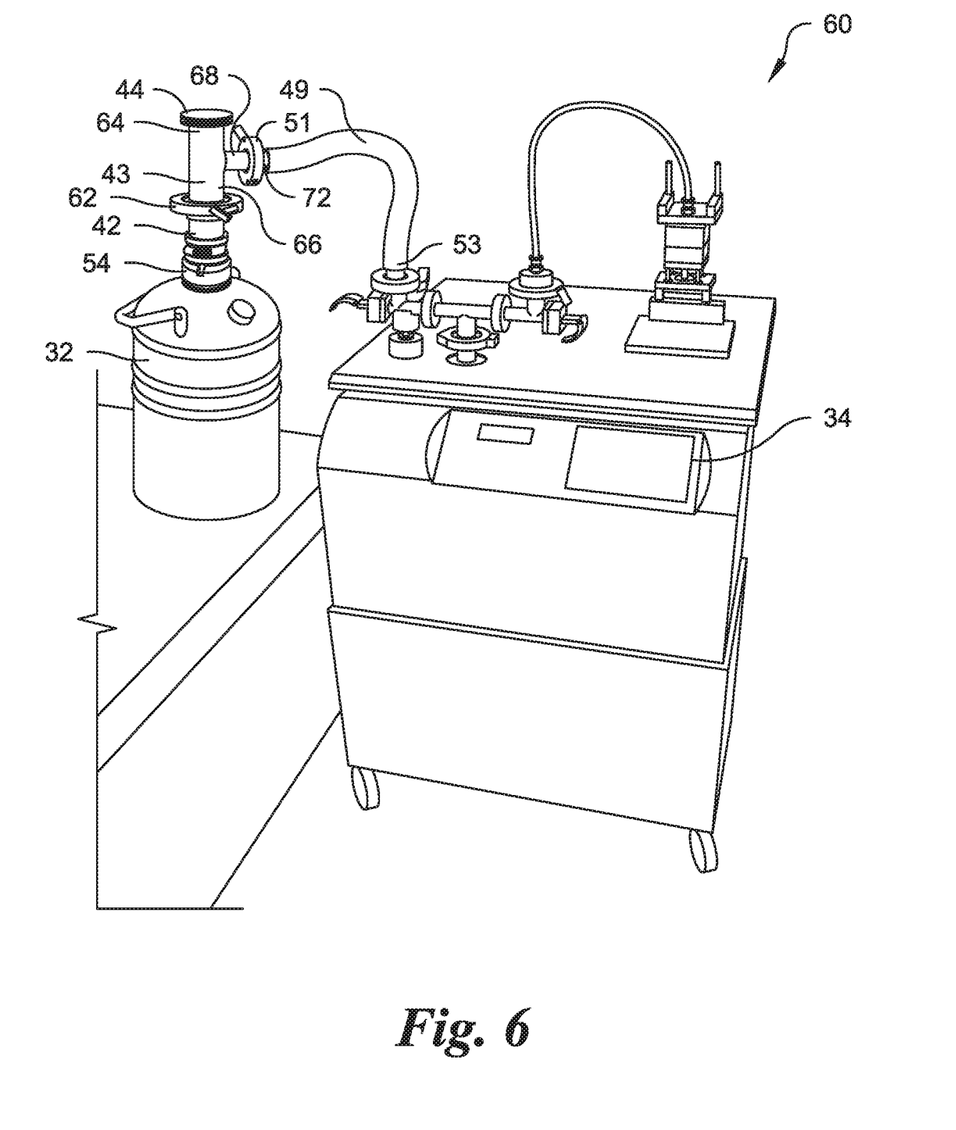
FIG. 6 is a perspective view of the testing system, according to an embodiment of the present invention.
Figure 7:
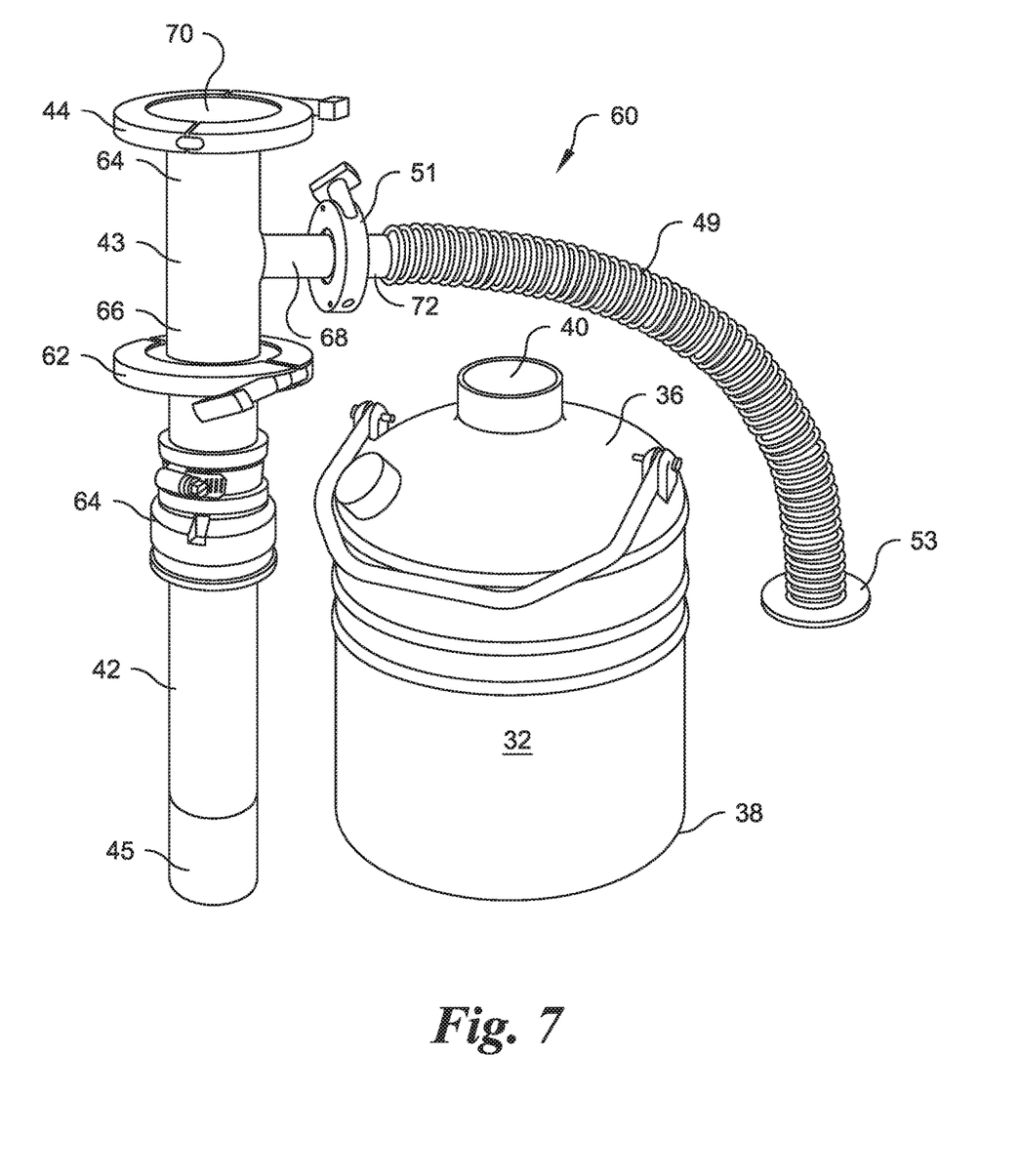
FIG. 7 is a perspective view of a portion of the testing system, in a disassembled state, according to an embodiment of the present invention.
Figure 8:
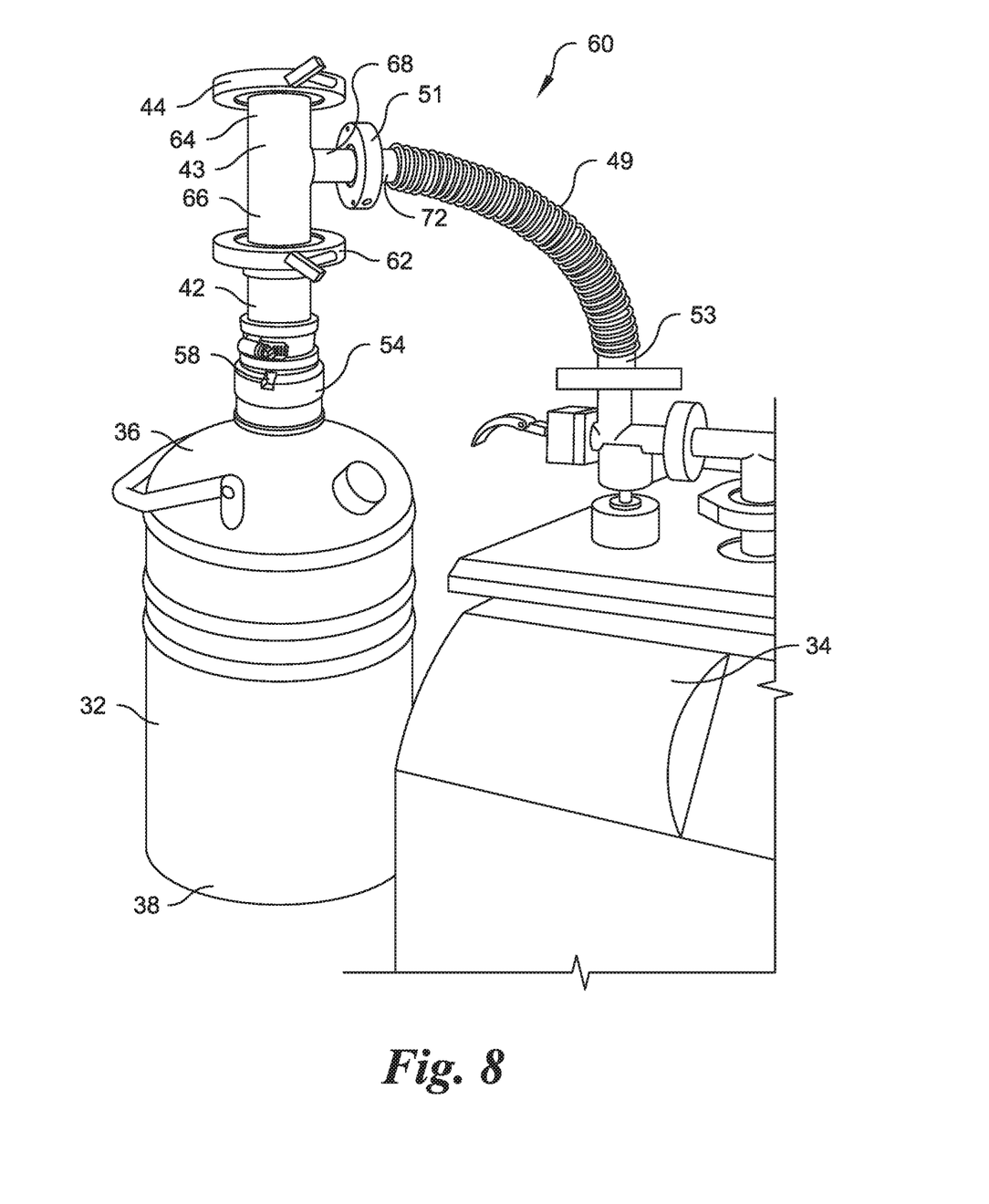
FIG. 8 a perspective view of a portion of the testing system, in an assembled state, according to an embodiment of the present invention.

In one embodiment for testing of the vial 10 prepared as described above, the system 60 shown in FIGS. 6-8 is used. The system 60 comprises a storage vessel 32 and a leak detection instrument 34, and more particularly a mass spectrometer. It will be understood by those skilled in the art that any known or commercially available mass spectrometer may be used. In one embodiment, the storage vessel 32 is a vacuum flask, commonly known as a dewar. For temperature control, the storage vessel 32 may contain any known cryogen or liquefied gas, such as, but not limited to liquid nitrogen, liquid oxygen, liquid hydrogen, liquid helium and the like. Preferably, the storage vessel 32 is at least partially filled with liquid nitrogen, such that the internal temperature of the storage vessel 32 is approximately −196° C. Referring to FIGS. 3A and 7, for example, the storage vessel 32 has a first end 36 and an opposing second end 38. The first end 36 is provided with an opening 40. A pipe or hollow tube 42 of an assembly, such as a dip tube, extends through the opening 40 of the storage vessel 32, so as to be securely fitted within the storage vessel 32. The hollow tube 42 may be configured to be removable from the storage vessel 32 or irremovable from the storage vessel 32. The dimensions of the hollow tube 42 may be adjusted as necessary to fit within any size opening 40 of the storage vessel 32.

Figure 2:
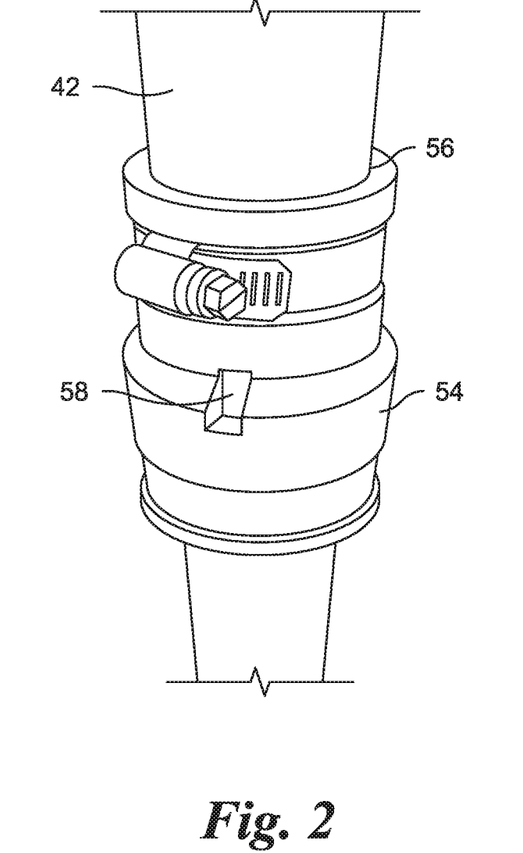
FIG. 2 is a perspective view of a coupler component of the testing system, according to an embodiment of the present invention.

In one embodiment, a coupler 54 is provided to facilitate securing of the hollow tube 42 in the opening 40, as shown in FIG. 2. The coupler 54 preferably has a generally cylindrical body sized and shaped to fit securely within the opening 40 and to surround the hollow tube 42. More particularly, the coupler 54 may be formed of a plurality of cylindrical portions of differing outer diameters, as shown in FIG. 2, or may be formed of a tube having a uniform outer diameter along its entire length. In one embodiment, an adhesive may be used to secure the coupler 54 in the opening 40. In another embodiment, the coupler 54 is secured within the opening 40 by a friction fit. The coupler 54 also has a cylindrical bore 56 extending through its body. The bore 56 is sized and shaped to receive the hollow tube 42 therein, and thus the coupler 54 provides for added stability of the hollow tube 42 within the opening 40 of the storage vessel 32. The coupler 54 further preferably includes at least one vent hole or opening 58 for venting of the gas contained within the storage vessel 32. In particular, since liquid nitrogen is constantly pressurizing and generating gas, the vent hole 58 in the coupler 54 is configured to vent the generated gas. It will be understood that a plurality of vent holes 58 may be provided in the coupler 54.

Referring to FIG. 7, the aforementioned assembly may comprise the hollow tube 42 and an adapter 43. The adapter 43 may be configured as a T-joint and removably connected to one end of the hollow tube 42. The connection is preferably secured with a mechanical connector 62, such as a clamp. The hollow tube 42 and adapter 43 may be made of metal or plastic. Preferably, the hollow tube 42 and adapter 43 are made of metal, such as stainless steel. The hollow tube 42 has a first end that is connected to the adapter 43 and configured to be positioned outside of the storage vessel 32 and an opposing second end 45 that is configured to be positioned inside of the storage vessel 32. More particularly, the second end 45 of the hollow tube 42 is positioned below the fill level of the liquid nitrogen in the storage vessel 32. The adapter 43 includes a first leg 64 on an opposing side of the T-joint from a second leg 66 attached to the hollow tube 42. The first and second legs 64, 66 are preferably formed as hollow tubes or pipes. The first leg 64 of the adapter 43 preferably includes an open end which is configured to be closed off with a cap 70 as will be described in greater detail below.

It will be understood that the assembly may instead comprise only an adapter configured as a T-joint, where the first and second legs of the adapter are constituted by a hollow tube having a first open end corresponding to the first open end of the first leg 64 of the adapter 43 and second end corresponding to the second end 45 of the follow tube 42. Such an assembly eliminates the need for the mechanical connector 62.

The hollow tube 42 is connected to the mass spectrometer 34 (see FIGS. 6 and 8) via the adapter 43 and a conduit 49. More particularly, the conduit 49 is releasably connected to a third leg 68 of the adapter 43 that is perpendicular to the first leg 64 and second leg 66. The third leg 68 is also preferably formed as a hollow tube or pipe. The conduit 49 is provided to place the hollow tube 42 in fluid communication with the mass spectrometer 34. The conduit 49 has a first end 72 which may be removably connected to the adapter 43 with another mechanical connector 53 (e.g., a clamp) and an opposing second end 53 which is connected to the mass spectrometer 34, as shown in FIG. 6. The mass spectrometer 34 is preferably a helium mass spectrometer. Preferably, prior to being used for analysis of the vials 10, the mass spectrometer 34 is calibrated against NIST traceable leak standards.

In one embodiment, the apparatus 60 further includes a fixture 46 housed within the hollow tube 42. More particularly, the fixture 46 is configured to be removably inserted within the hollow tube 42 and the adapter 43 through the open end of the first leg 64 after removing a cap 70. The cap 70 may be removably attached to the end of the first leg 64 by any means known by those of skill in the art. A preferred means is a clamp 44. In another embodiment, the cap 70 may be threaded onto the end of the first leg 64. The fixture 46 may be a rod, tube or wire configured to hold a sealed vial 10 within the hollow tube 42 for placement in the storage vessel 10 for testing. The fixture 46 has a first end 47 and an opposing second end 50. The second end 50 of the fixture 46 is configured to engage or hold the sealed vial 10.

In one embodiment, the second end 50 includes or is formed as a receptacle or cavity configured to receive the vial 10, and more particularly the sealed vial 10 filled with helium. For example, the second end 50 may include a cup-shaped receptacle (not shown) which is sized and shaped to receive the sealed vial 10 therein for testing thereof.

Figure 3B:
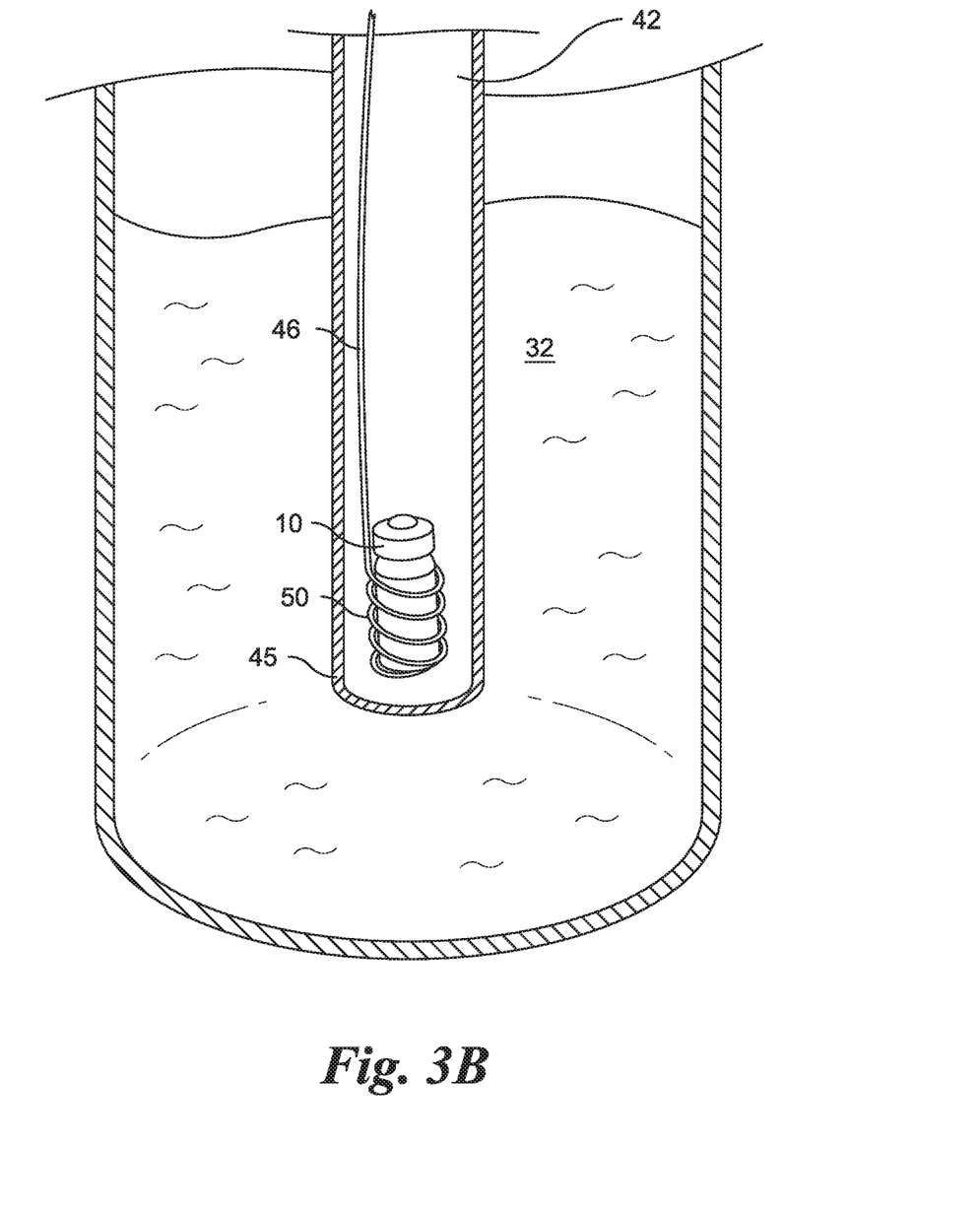

As another example, as shown in FIGS. 3A-3B, the fixture 46 may be in the form of a flexible metal wire, the second end 50 of which is wound or coiled around the sealed vial 10 to secure the vial 10 for testing.

Figure 4A:
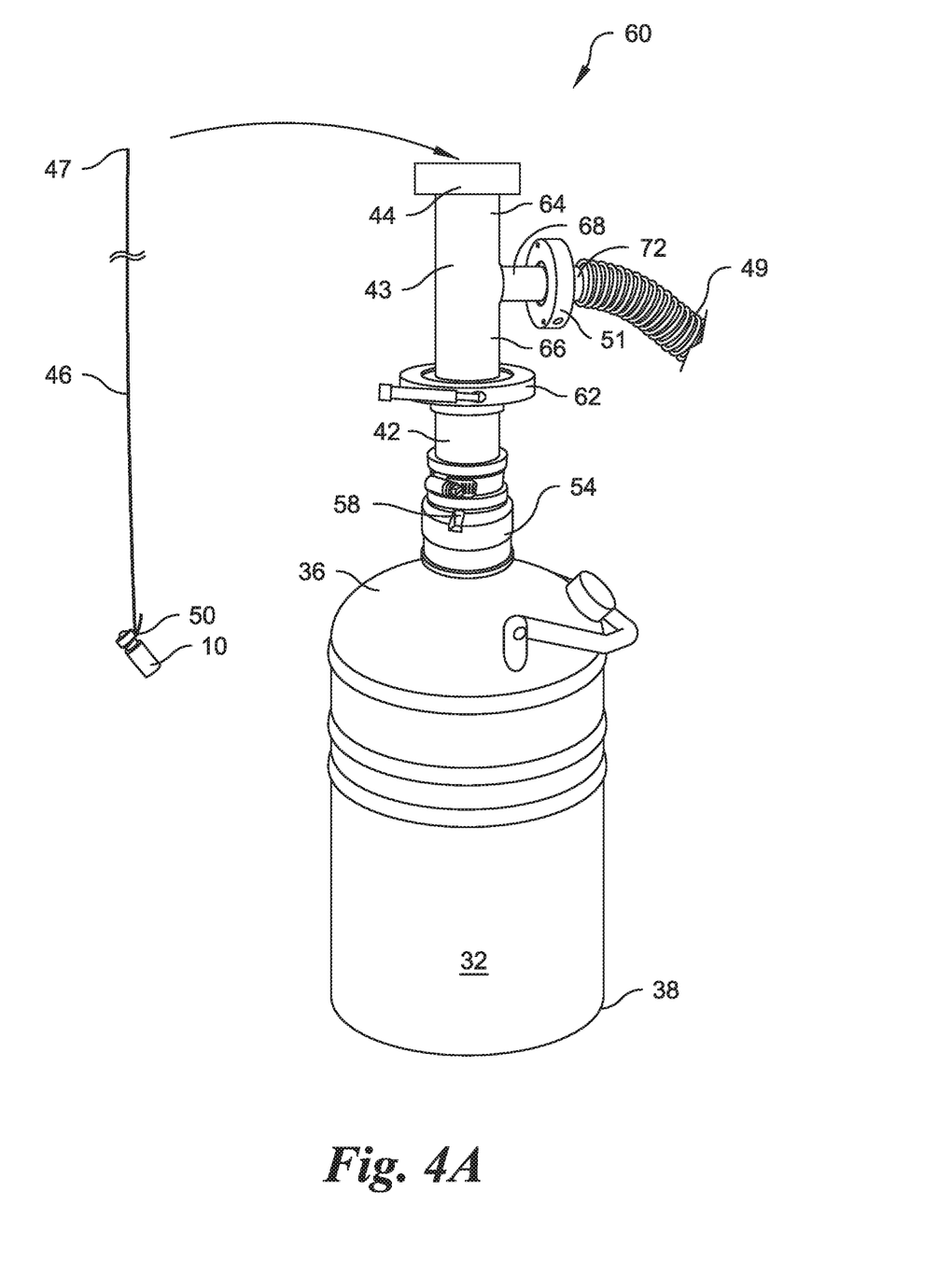
FIGS. 4A-4B depict a mechanism for securing the sealed vial for testing, according to another embodiment of the present invention.
Figure 4B:
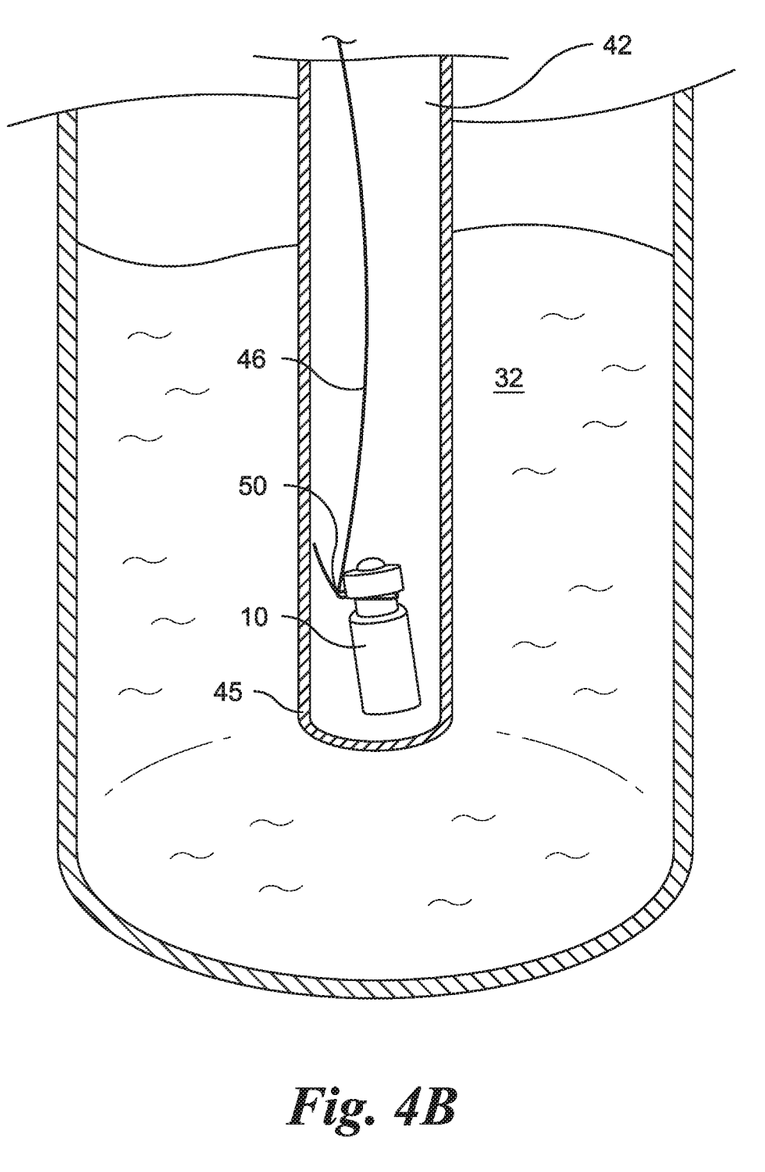

As another example, as shown in FIGS. 4A-4B, the fixture 46 may be in the form of a flexible plastic (e.g., nylon) wire or rope, the second end 50 of which is tied or otherwise secured around the sealed vial 10, and more particularly around the neck 12 of the sealed vial 10, to secure the vial 10 and lower the vial 10 into the storage vessel 32 for testing thereof.

Figure 5A:
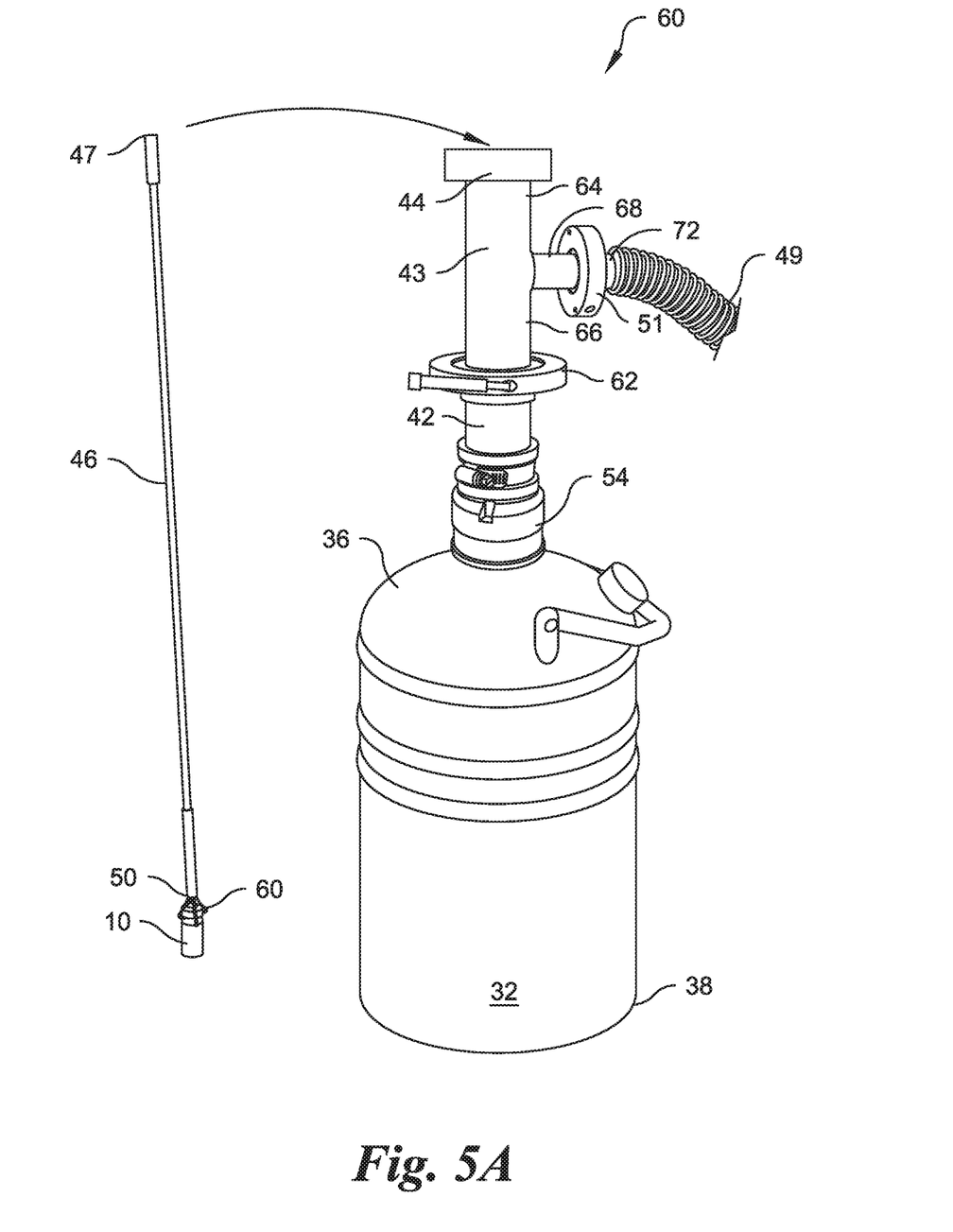
FIGS. 5A-5B depict a mechanism for securing the sealed vial for testing, according to another embodiment of the present invention.
Figure 5B:
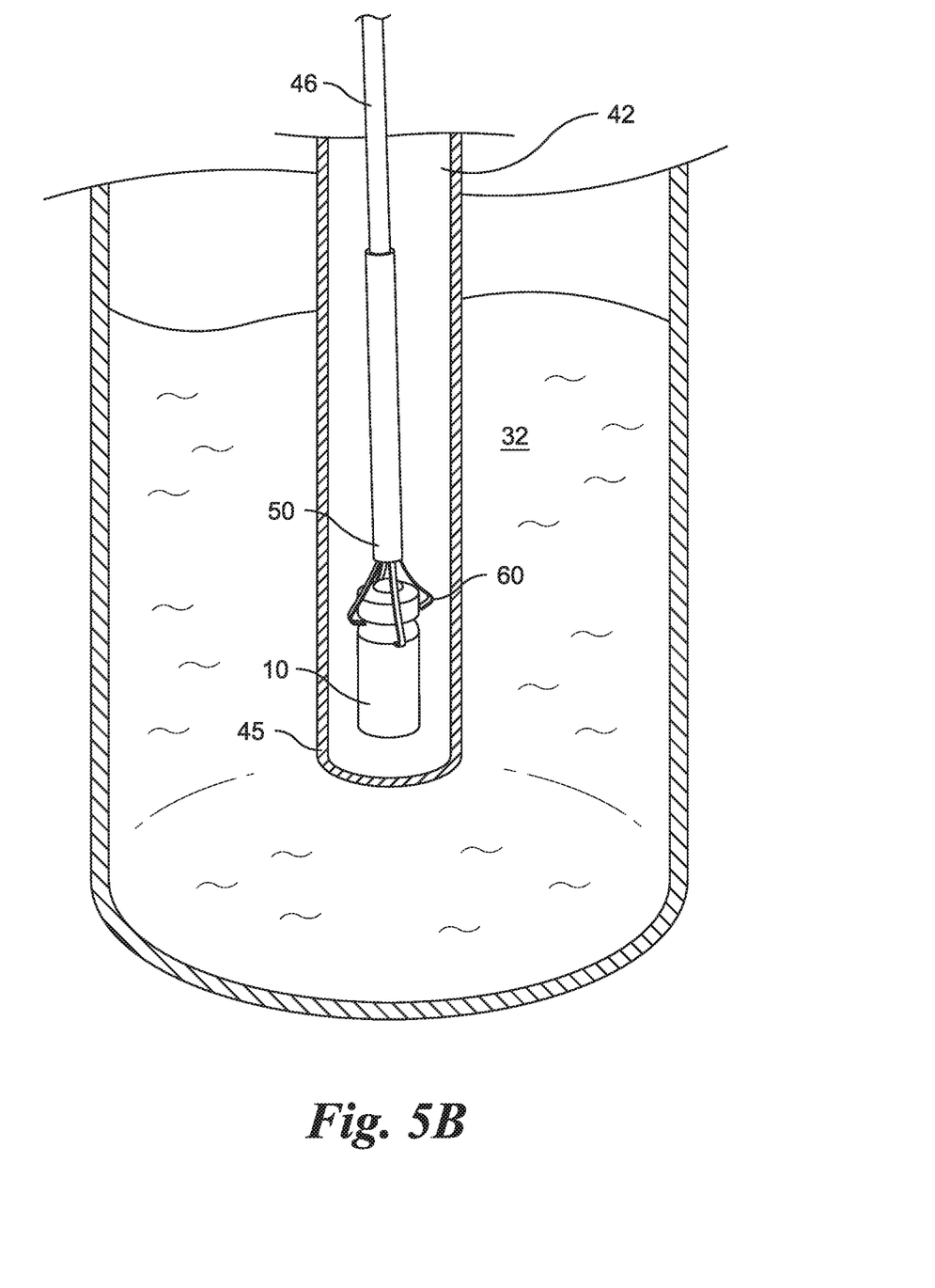

As another example, as shown in FIGS. 5A-5B, the fixture 46 may be in the form of a tube (metal or plastic), the second end 50 of which includes a securing mechanism 60 comprising a plurality of gripping fingers or claws for gripping a portion of the sealed vial 10 to secure the vial 10 for testing.

While some specific examples of the fixture 46, and more particularly of the mechanism provided at the second end 50 of the fixture 46 for securing the sealed vial 10, are provided in FIGS. 3A-5B, it will be understood by those skilled in the art that the fixture 46 and mechanism provided at the second end 50 thereof may take any form that is capable of securing the sealed vial 10 and lowering it down into the storage vessel 32 for testing purposes.

For implementation of the testing method, the hollow tube 42 is fitted into the opening 40 of the storage vessel 32, such that the coupler 54 is securely fitted in the opening 40, with the second end 45 of the hollow tube 42 being positioned inside of the storage vessel 32 below the fill level of the liquid nitrogen, and the first end of the hollow tube 42 being positioned outside of the storage vessel 32 and connected to the adapter 43. Next, the helium-filled and sealed vial 10, preferably prepared as discussed above, is secured at the second end 50 of the fixture 46, and the fixture 46 is then inserted through the open end of the first leg 64 of the adapter 43 and into the hollow tube 42 toward the second end 45, until the vial 10 is positioned at or proximate to the second end 45 of the hollow tube 42, so as to place the vial 10 and its drug contents at a cryogenic temperature. In one embodiment, the first end 47 of the fixture 46 is secured to the first leg 64 of the adapter 43 and the open end of the first leg 64 of the adapter 43 is subsequently closed off by a cap 70 and clamp 44. In another embodiment, the first end 47 of the fixture 46 may be secured to or integrally formed with a cap 70 configured to close off the open end of the first leg 64 of the adapter 43. In such an embodiment, the cap 70 may be grasped to insert the fixture 46 into the adapter 43 and hollow tube 42 through the initially open end of the first leg 64 of the adapter 43 and then the cap 70 may be positioned to close off the open end of the first leg 64.

In another embodiment (not shown), the storage vessel 32 may be eliminated by incorporating a cooling system into the fixture 46. For example, in one embodiment, the second end of the fixture 46 in which the vial 10 is placed may be provided with a jacket or coil that wraps around the vial 10, and liquefied gas (e.g., liquid nitrogen) is flowed through the jacket or coil for cooling the vial 10 down to cryogenic temperature. In another embodiment, the adapter 43 and/or hollow tube 42 may be provided with the jacket or coil through which the liquefied gas or some other coolant flows.

It will be understood that the temperature within the storage vessel 32 may vary depending upon the cryogen utilized. For example, the internal temperature of the storage vessel 32 is preferably approximately −150° C. or lower, more preferably approximately −180° C. or lower, and most preferably approximately −196° C. (i.e., the boiling point of liquid nitrogen) or lower.

Once the sealed vial 10 is secured within the storage vessel 32, as described above, operation of the mass spectrometer 34 is initiated. The mass spectrometer 34 places the vial 10 under vacuum and measures the helium as it escapes from the vial 10 at the cryogenic temperature, and more preferably at −196° C. The helium partial pressure present in a leak detector is measured by the mass spectrometer 34 and displays this "leak" from the vial 10 as a leak rate, which is measured quantitatively. After the leak rate has been determined, the vial 10 is allowed to warm to room temperature. Then, the helium concentration inside the vial 10 is measured with a calibrated headspace analyzer probe (not shown) to determine the amount of helium remaining in the vial 10. The helium concentration and the measured helium leak rate are then used to calculate the actual helium leak rate (cc/sec) of the vial 10. The helium leak rate is related to the size of the leak through which the helium escapes.

On average, the helium leak rates at −180° C. for a vial prepared according to an embodiment of the present invention are on the order of E-9 to E-10 std cc/s. Comparatively, the leak rates at room temperature for equivalent vials filled with helium are in range of E-7 to E-8 std cc/s. The leak rate measured according to the embodiments of the present invention demonstrate a significant decrease when comparing room temperature samples to samples analyzed at −180° C.

It will be understood that while the discussion herein relates primarily to vials, the containers may include any vessel suitable for storing or containing a biologic or drug product, such as syringes, cartridges, blister packs and the like.

It will also be understood that other gases may be utilized with the inventive system/method, depending on the type of analysis instrument being used to detect the gas used to fill the headspace of the container, including, but not limited to, gas chromatography/mass spectrometry (GC/MS) and emission spectroscopy.

EXAMPLES

Experiments were conducted to test a total of 80 vials at −180° C., using a system and method according to an embodiment of the present invention, as well as control samples. The vials were either 2 mL or 10 mL vials and made of a cyclic olefin polymeric material (Crystal Zenith® (CZ), manufactured by Daikyo Seiko, Ltd). The closures were all 13 mm or 20 mm halobutyl rubber stoppers. The vials were all sealed and prepared as described above (i.e., all sample vials, positive controls and negative controls were filled with helium and displaced air was evacuated from the vials), and then crimped closed. The vials were then individually analyzed at cryogenic temperatures (e.g., at −180° C.) to determine the respective helium leak rate of each vial.

More particularly, after calibrating a helium mass spectrometer (SIMS 1284+ Seal Integrity Monitoring System manufactured by Leak Detection Associates, Inc.) and confirming system suitability, i.e., confirming that calibration was effective, each vial was placed into a storage vessel, namely a dewar, for helium leak analysis. Each storage vessel for testing the 2 mL and 10 mL vials was attached to the helium mass spectrometer. A temperature of −180° C. was maintained on the sample throughout the entire helium leak analysis. The helium mass spectrometer pulled vacuum on the sample and produced a quantitative leak rate in standard cubic centimeters per second. If the instrument was unable to successfully pull vacuum on the sample, this was identified as a "Gross Leak." This procedure was performed for both the 2 mL and 10 mL vial sizes.

On each day of analysis, the same five positive controls having a 2 μm aperture in the body of the vials along with 20 new vials were analyzed. Validation of the procedure was performed by a primary and second analyst. The primary analyst performed the analysis for the Precision, Robustness, Specificity, and Method Detection Limit (MDL) sections of the procedure. The second analyst performed Intermediate Precision. Results of the primary and secondary analysts are provided in Tables 1-4. The criteria for a successful sample was less than or equal to 1.9E-6 std cc/s.

Precision

On the first day (day 1), five (5) positive controls at 2 μm and twenty (20) samples were analyzed using the above described system and method. The results are shown in Table 1 , where "MHLR" represents the measured helium leak rate, or the leak rate determined by the vacuum test without correction for helium concentration.

Intermediate precision

On the second day (day 2), a second analyst followed the same procedure of the system 60 and method of the present invention using the same positive controls as the primary analyst, but a different set of twenty (20) sample containers, using a different helium mass spectrometer. The results are shown in Table 1.

Specificity, MDL, Instrument Robustness, and Sample Type Robustness

On the third day (day 3), the primary analyst followed the same procedure of the system and method of the present invention using the same positive controls, and the results are provided in Table 1.

Sample type robustness was performed by analyzing a 2 mL sample container, and the results are provided in Table 2.

Specificity was established by confirming that the instrument was able to detect between passing and failing containers. The minimum detection limit was verified at 2 μm.

Instrument Robustness was also performed and demonstrated by performing the analysis using a 50 second and 70 second data collection time in addition to the nominal 60 second data collection time. The results show that the instrument is robust in its ability to generate expected results considering any possible variations in the instrument data collection. These results are shown in Tables 3 and 4.

All of the sample vials tested under the present invention passed the leak rate criteria of less than or equal to 1.9 E-6 std cc/s, while the positive controls exceeded 1.9E-6 std cc/s.

TABLE 1

Results for 10 mL CZ Vials

| Vial # | Analyst 1 Precision MHLR (std cc/s) | Analyst 2 Intermediate Precision MHLR (std cc/s) | Analyst 1 Specificity/MDL MHLR (std cc/s) |
|---|---|---|---|
| Positive Control 1 | Gross Leak | 1.2E-4 | Gross Leak |
| Positive Control 2 | Gross Leak | 1.7E-4 | 2.5E-4 |
| Positive Control 3 | Gross Leak | Gross Leak | 2.4E-4 |
| Positive Control 4 | Gross Leak | Gross Leak | Gross Leak |
| Positive Control 5 | Gross Leak | Gross Leak | Gross Leak |
| 1 | 2.9E-9 | 1.2E-9 | N/A |
| 2 | 2.8E-9 | 4.6E-10 | N/A |
| 3 | 3.5E-9 | 2.1E-10 | N/A |
| 4 | 3.4E-9 | 2.5E-9 | N/A |
| 5 | 3.2E-9 | 1.2E-9 | N/A |
| 6 | 3.0E-9 | 4.5E-9 | N/A |
| 7 | 3.6E-9 | 5.5E-9 | N/A |
| 8 | 4.1E-9 | 4.5E-9 | N/A |
| 9 | 4.4E-9 | 1.9E-9 | N/A |
| 10 | 3.2E-9 | 1.8E-9 | N/A |
| 11 | 3.6E-9 | 5.6E-9 | N/A |
| 12 | 2.7E-9 | 3.5E-9 | N/A |
| 13 | 2.7E-9 | 1.7E-9 | N/A |
| 14 | 2.4E-9 | 9.6E-10 | N/A |
| 15 | 2.2E-9 | 5.6E-10 | N/A |
| 16 | 2.5E-9 | 4.2E-10 | N/A |
| 17 | 2.3E-9 | 3.5E-10 | N/A |
| 18 | 2.2E-9 | 4.2E-10 | N/A |
| 19 | 2.2E-9 | 4.6E-10 | N/A |
| 20 | 2.1E-9 | 5.2E-10 | N/A |

TABLE 2

Results for 2 mL CZ Vials (Sample Type Robustness)

| Vial # | Analyst 1 MHLR (std cc/s) |
|---|---|
| 235285 | Gross Leak |
| 235291 | 4.2E-4 |
| 235295 | Gross Leak |
| 235301 | 2.5E-4 |
| 235303 | Gross Leak |
| 1 | 4.8E-10 |
| 2 | 4.0E-10 |
| 3 | 4.0E-10 |
| 4 | 3.6E-10 |
| 5 | 3.9E-10 |
| 6 | 3.9E-10 |
| 7 | 3.5E-10 |
| 8 | 3.4E-10 |
| 9 | 3.5E-10 |
| 10 | 3.9E-10 |
| 11 | 3.4E-10 |
| 12 | 4.2E-10 |
| 13 | 4.5E-10 |
| 14 | 3.8E-10 |
| 15 | 3.4E-10 |
| 16 | 4.1E-10 |
| 17 | 4.4E-10 |
| 18 | 4.3E-10 |
| 19 | 3.6E-10 |
| 20 | 2.7E-10 |

(235285, 235291, 235295, 235301 and 235303 represent Positive Controls 1, 2, 3, 4 and 5 respectively)

TABLE 3

Instrument Robustness - 50 Second Data Collection Time

| Vial # | MHLR (std cc/s) #1800005127 |
|---|---|
| 1 | 7.6E-10 |
| 2 | 1.3E-9 |
| 3 | 1.6E-9 |
| 4 | 1.2E-9 |
| 5 | 1.1E-9 |
| 6 | 9.7E-10 |
| 7 | 1.0E-7 |
| 8 | 6.9E-10 |
| 9 | 8.6E-10 |
| 10 | 6.2E-10 |

TABLE 4

Instrument Robustness - 70 Second Data Collection Time

| Vial # | MHLR (std cc/s) #1800005127 |
|---|---|
| 1 | 3.2E-9 |
| 2 | 2.2E-9 |
| 3 | 1.9E-9 |
| 4 | 5.2E-9 |
| 5 | 1.1E-9 |
| 6 | 1.3E-9 |
| 7 | 1.2E-9 |
| 8 | 1.1E-9 |
| 9 | 1.0E-9 |
| 10 | 7.4E-10 |

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A system for testing the closure integrity of a sealed container at a cryogenic temperature, the system comprising:
a sealed container containing helium having an opening sealed by a closure;
a cryogenic storage vessel at least partially filled with a cryogenic fluid at the cryogenic temperature, the cryogenic storage vessel having a first end and an opposing second end, the first end being provided with an opening;
a hollow tube extending through the opening of the cryogenic storage vessel, the hollow tube having a first end positioned outside of the cryogenic storage vessel and an opposing second end positioned inside the cryogenic storage vessel;

a fixture having a first end and an opposing second end, the second end being configured to engage the sealed container, the fixture being configured to be removably inserted within the hollow tube through an opening at the first end of the hollow tube, such that the sealed container is positioned at or proximate the second end of the hollow tube; and a leak detection unit connected to the hollow tube.

2. The system according to claim 1, wherein the cryogenic temperature is approximately −150° C. or below.

3. The system according to claim 1, wherein the cryogenic fluid is liquid nitrogen.

4. The system according to claim 1, wherein the cryogenic storage vessel is a dewar.

5. The system according to claim 1, further comprising a coupler secured within the opening of the cryogenic storage vessel, the coupler surrounding at least a portion of the hollow tube.

6. The system according to claim 5, wherein the coupler includes at least one vent hole for venting of gas generated by the cryogenic fluid.

7. The system according to claim 1, wherein the fixture comprises a flexible wire, a portion of the wire being wound around at least a portion of the sealed container.

8. The system according to claim 1, wherein the second end of the fixture includes a plurality of claws for gripping a portion of the sealed container.

9. The system of claim 1, wherein the leak detection unit is a helium mass spectrometer.

10. A method of testing the closure integrity of a sealed container at a cryogenic temperature, the method comprising:

providing a sealed container containing helium;

providing a cryogenic storage vessel at least partially filled with a cryogenic fluid at the cryogenic temperature, the cryogenic storage vessel having a first end and an opposing second end, the first end being provided with an opening;

positioning a hollow tube within the opening of the cryogenic storage vessel, the hollow tube having a first end positioned outside of the cryogenic storage vessel and an opposing second end positioned inside the cryogenic storage vessel below a fill level of the cryogenic fluid;

securing the sealed container at a distal end of a fixture;

inserting the fixture into the hollow tube, such that the sealed container is positioned at or proximate the second end of the hollow tube; and connecting the hollow tube to a leak detection unit and measuring a flow rate of the helium escaping from the sealed container at the cryogenic temperature.

11. The method according to claim 10, wherein the cryogenic temperature is approximately −150° C. or below.

12. The method according to claim 10, wherein the cryogenic fluid is liquid nitrogen.

13. The method according to claim 10, wherein the cryogenic storage vessel is a dewar.

14. The method according to claim 10, wherein the leak detection unit is a helium mass spectrometer.

15. A method of testing the closure integrity of a sealed container at a cryogenic temperature, the method comprising:

preparing a sealed container by:
inserting an elastomeric stopper into an opening of a container,
forming a first opening and a second opening through a body of the elastomeric stopper,
connecting a first conduit to the first opening, a first end of the first conduit being engaged with the first opening and an opposing second end of the first conduit being engaged to a supply of helium,
connecting a second conduit to the second opening, a first end of the second conduit being engaged with the second opening,
supplying helium into the container via the first conduit until air within the container has been displaced with helium, the displaced air exiting the container via the second conduit,
removing the first and second conduits from the first and second openings, respectively, and
covering the first and second openings with a cyanoacrylate adhesive and allowing the cyanoacrylate adhesive to cure for a predetermined period of time, in order to form the sealed container;

providing a cryogenic storage vessel at least partially filled with a cryogenic fluid at the cryogenic temperature;

positioning the sealed container within the cryogenic storage vessel; and using a leak detection unit connected to the cryogenic storage vessel and measuring a flow rate of the helium escaping from the sealed container at the cryogenic temperature.

16. The method according to claim 15, the method further comprising:

positioning a hollow tube through an opening of the cryogenic storage vessel, the hollow tube having a first end positioned outside of the cryogenic storage vessel and an opposing second end positioned inside the cryogenic storage vessel below a fill level of the cryogenic fluid;

securing the sealed container at a distal end of a fixture; and inserting the fixture into the hollow tube, such that the sealed container is positioned at or proximate the second end of the hollow tube.

17. The method according to claim 15, wherein the cryogenic temperature is approximately −150° C. or below.

18. The method according to claim 15, wherein the cryogenic fluid is liquid nitrogen.

19. The method according to claim 15, wherein the cryogenic storage vessel is a dewar.

20. The method according to claim 15, wherein the leak detection unit is a helium mass spectrometer.

* * * * *